(12) United States Patent
Ohhira

(10) Patent No.: US 6,728,490 B1
(45) Date of Patent: Apr. 27, 2004

(54) OPTICAL TRANSMITTER, OPTICAL RECEIVER, OPTICAL TRANSMISSION SYSTEM, AND OPTICAL TRANSMISSION METHOD

(75) Inventor: Risato Ohhira, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/570,125

(22) Filed: May 12, 2000

(30) Foreign Application Priority Data

May 12, 1999 (JP) .......................................... 11-130714

(51) Int. Cl.$^7$ .............................................. H04B 10/12
(52) U.S. Cl. ....................... 398/142; 398/147; 398/161; 398/186; 398/188; 398/192
(58) Field of Search ................................ 359/154, 173, 359/181, 183, 188, 193, 195

(56) References Cited

U.S. PATENT DOCUMENTS

| | | | | |
|---|---|---|---|---|
| 5,424,863 A | * | 6/1995 | Gertel .......................... | 359/173 |
| 5,532,857 A | * | 7/1996 | Gertel et al. ................. | 359/154 |
| 5,880,870 A | * | 3/1999 | Sieben et al. ................. | 359/181 |
| 5,892,608 A | * | 4/1999 | Suzuki et al. ................ | 359/189 |
| 6,008,919 A | * | 12/1999 | Watanabe ..................... | 359/124 |
| 6,057,951 A | * | 5/2000 | Sugawara ..................... | 359/194 |
| 6,097,525 A | * | 8/2000 | Ono et al. .................... | 359/181 |
| 6,163,395 A | * | 12/2000 | Nemecek et al. ............ | 359/187 |

OTHER PUBLICATIONS

T. Ono et al., "Characteristics of Optical Duobinary Signals in Terabit/s Capacity, High–Spectral Efficiency WDM Systems", (*Journal of Lightwave Technology*, vol. 16, No. 5, pp. 788–797, May 1998).

* cited by examiner

Primary Examiner—Jason Chan
Assistant Examiner—Dzung Tran
(74) Attorney, Agent, or Firm—Young & Thompson

(57) ABSTRACT

An optical transmitter in accordance with the present intention consists of a light source and an interference unit. The interference unit consists of an optical power divider, an intensity modulator, a gain variation device, a phase shifter, an optical coupler, and a phase controller. In the optical transmitter, continuous-wave light emanating from the light source is bifurcated by the optical power divider. One of resultant continuous-wave rays has the intensity thereof modulated based on transmission data by the intensity modulator. The other continuous-wave light has the power thereof adjusted by the gain variation device, and then has the phase thereof shifted by the phase shifter. The optical coupler joins the light signals, whereby the phase of part of the modulated light signal is shifted. The gain variation device is realized with a combination of, for example, an optical amplifier and an optical attenuator. The phase shifter is realized for example, a phase modulator and an optical delay device. A phase controller controls the phase shifter and gain variation device. A light signal emitted from the interference unit is transmitted over a transmission line that is not shown.

13 Claims, 10 Drawing Sheets

OPTICAL TRANSMITTER, OPTICAL RECEIVER, OPTICAL TRANSMISSION SYSTEM, AND OPTICAL TRANSMISSION METHOD

BACKGROUND OF THE INVENTION

1. Field of the Invention

The present invention relates to an optical transmitter, an optical receiver, an optical transmission system, and an optical transmission method. More particularly, this invention is concerned with an optical transmitter, an optical receiver, an optical transmission system, and an optical transmission method for improving the resistivity of an optical transmission system to wavelength dispersion.

2. Description of the Related Art

In high-speed optical fiber communication systems, waveform distortion derived from waveform dispersion occurring along an optical fiber that is a transmission line is a factor of restricting a transmission rate or a distance of transmission. A transmission method making a system resistive to wavelength dispersion and a wavelength dispersion compensation technology are therefore indispensable.

Conventionally proposed transmission methods making a system resistive to wavelength dispersion include an optical duobinary method. For the details of the optical duobinary method, refer to "Characteristics of Optical Duobinary Signals in Terabits Capacity, High-spectral Efficiency WDM Systems" (Journal of Lightwave Technology, Vol. 16, No. 5, pp. 788–797, May 1998).

According to the optical duobinary method, a binary signal is converted into a ternary signal or any other multilevel signal in order to compress the spectrum of an electric signal. The spectrum of the electric signal is compressed to agree with approximately a half of the spectrum of a non-return-to-zero (NRZ) signal to be transmitted at the same bit rate as a bit rate at which a light signal proportional to the electric signal is transmitted. Consequently, compared with the NRZ signal to be transmitted at the same bit rate, the light signal whose spectrum has been narrowed according to the optical duobinary method is permitted to disperse by approximately twice a larger magnitude while traveling over an optical transmission line.

However, a precoder circuit employed according to the optical duobinary method delays an output of an exclusive OR circuit by a time during which a data signal represents one bit, and feeds it back to one input terminal thereof. As a transmission rate increases, higher precision is required to adjust a delay time. This poses a problem in that it becomes difficult to realize the precoder circuit.

According to the optical duobinary method, an electric signal is converted into a multilevel signal. This poses a problem in that the configuration of a currently commercially available transmitter/receiver for transmitting or receiving the NRZ signal must be modified or optimized.

SUMMARY OF THE INVENTION

An object of the present invention is to solve the foregoing problems and to provide an optical transmitter, an optical receiver, an optical transmission system, and an optical transmission method making it possible to obviate a precoder circuit. Moreover, with the optical transmitter, optical receiver, optical transmission system, and optical transmission method in accordance with the present invention, a coding method using a non-return-to-zero (NRZ) signal or a return-to-zero (RZ) signal as a carrier and making an optical transmission system highly resistive to dispersion can be realized.

An optical transmitter according to the present invention comprises an optical power divider, a light modulator, a phase shifter, and an optical coupler. The optical power divider divides input light into first and second continuous wave (CW) lights. The light modulator modulates the first CW light according to a data signal so as to output modulated light. The phase shifter shifts the phase of the second CW light so as to output phase-shifted light. The optical coupler couples the modulated light and phase-shifted light.

An optical receiver according to the present invention comprises a first photo-detector, a clock extracting circuit, and a maximum level detection circuit. The first photo-detector converts a first light signal to be input into an electric signal. The clock extracting circuit extracts a predetermined frequency component of the electric signal and outputs it as a clock signal. The maximum level detection circuit detects the maximum level of the clock signal.

An optical transmission system according to the present invention comprises an optical transmitter, an optical transmission line, and an optical receiver. The optical transmitter outputs a light signal. The light signal is transmitted over the optical transmission line. The optical receiver receives the light signal output over the transmission line. The optical transmitter comprises the foregoing optical transmitter, and the optical receiver comprises the foregoing optical receiver. The optical transmission line includes a control signal transmission line over which the maximum level is transmitted to the optical transmitter.

An optical transmission method according to the present invention comprises four steps. At the first step, light emanating from a light source is divided into at least two division lights. At the second step, the phase of one of the division lights is shifted in order to produce phase-shifted light. At the third step, the other division light is modulated in order to produce modulated light. At the fourth step, the phase-shifted light and modulated light are coupled.

BRIEF DESCRIPTION OF THE DRAWINGS

The above and other objects, features, and advantages of the present invention will become more apparent from the following detailed description when taken in conjunction with the accompanying drawings wherein.

DETAILED DESCRIPTION OF THE PREFERRED EMBODIMENTS

Figure 1:
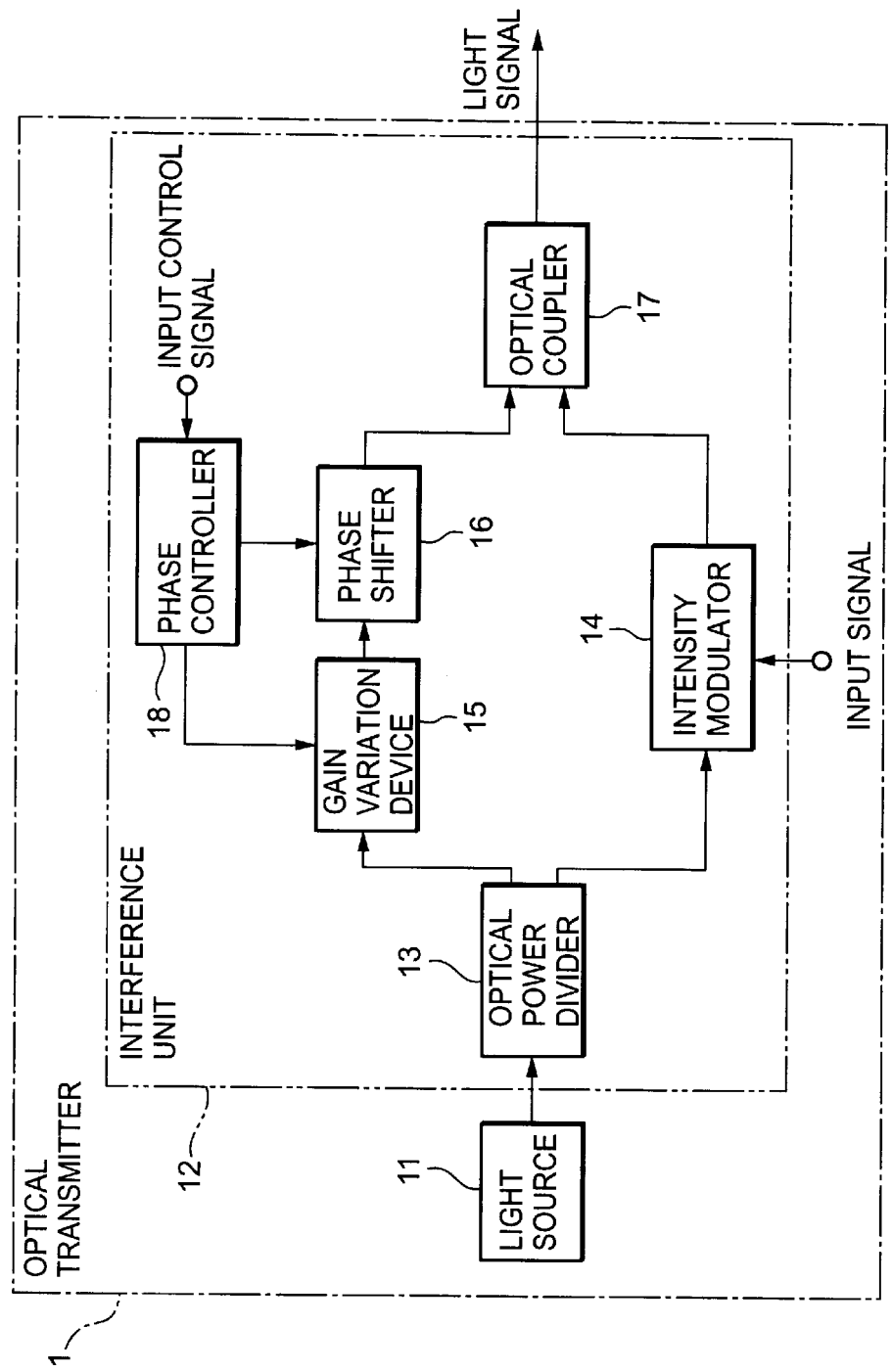
FIG. 1 is a block diagram showing the configuration of an optical transmitter in accordance with the first embodiment of the present invention.

Next, embodiments of the present invention will be described with reference to the drawings. FIG. 1 is a block diagram showing the configuration of an optical transmitter in accordance with the first embodiment of the present invention. Referring to FIG. 1, an optical transmitter 1 comprises a light source 11 and an interference unit 12. The interference unit 12 comprises an optical power divider 13, an intensity modulator 14, a gain variation device 15, a phase shifter 16, an optical coupler 17, and a phase controller 18.

In the optical transmitter 1, continuous-wave light emanating from the light source 11 is bifurcated by the optical power divider 13. One of two resultant continuous-wave lights has its intensity modulated based on transmission data by the intensity modulator 14. The other continuous-wave light has its power adjusted by the gain variation device 15, and has its phase shifted by the phase shifter 16. The optical coupler 17 couples the light signals. Thus, part of a modulated light signal has it phase shifted.

The gain variation device 15 may be realized with a combination of, for example, an optical amplifier and an optical attenuator. The phase shifter 16 may be realized with, for example, a phase modulator and an optical delay unit. The phase controller 18 controls the phase shifter 16 and gain variation device 15. A light signal emitted from the interference unit 112 is transmitted over a transmission line that is not shown.

According to the foregoing configuration, the gain variation device 15 is installed in the input stage of the phase shifter 16. The present invention is not limited to this configuration. Alternatively, the gain variation device 15 may be installed in the output stage of the phase shifter 16 or in both the input and output stages thereof. Moreover, the gain variation device 15 may be installed in an arm including the intensity modulator 14 instead of an arm including the phase shifter 16, or may be installed in both the arms.

An advantage to be provided by the present embodiment will be described by introducing concrete formulas. Assume that the spectrum of an electric signal used as an intensity modulating signal is G(f). A light signal modulated based on the electric signal having the spectrum G(f) is propagated over an optical transmission line causing wavelength dispersion of a magnitude D, and then photoelectrically converted. The spectrum S(f) of an electric signal resulting from photoelectric conversion is expressed as follows:

$$S(f)=\alpha \times \cos(\pi f^2 \lambda^2 D/c) G(f) + \beta(f)$$

where $\lambda$ denotes the wavelength of light output from the light source, c denotes a light velocity, f denotes a frequency, $\alpha$ denotes a coefficient, and $\beta$ denotes a correction term. $\beta(f)$ is much smaller than the first term in the right side. As the magnitude D of wavelength dispersion increases, S(f) becomes more dependent on $\cos(\pi f^2 \lambda^2 D/c) G(f)$, or in other words, the waveform of the electric signal deteriorates markedly.

According to the present embodiment, the phase of part of light output from the light source is shifted by $\Delta\phi$. In this cause, the spectrum S(f) of the electric signal resulting from photoelectric conversion is expressed as follows:

$$S(f)=\alpha \times 2\cos(\Delta\phi/2)$$

$$\cos(\pi f^2 \lambda^2 D/c - \beta\phi/2) G(f) + \gamma(f)$$

where $\gamma(f)$ is a correction term and much smaller than the first term in the right side. As apparent from the formula, $\pi f^2 \lambda^2 D/c - \Delta\phi/2$ contained in the first term in the right side is converged to 0 by properly adjusting $\Delta\phi$. Therefore, an increase in the magnitude D of wavelength dispersion can be compensated with the phase shift $\Delta\phi$. Consequently, deterioration in the waveform derived from waveform dispersion can be suppressed.

Figure 2:
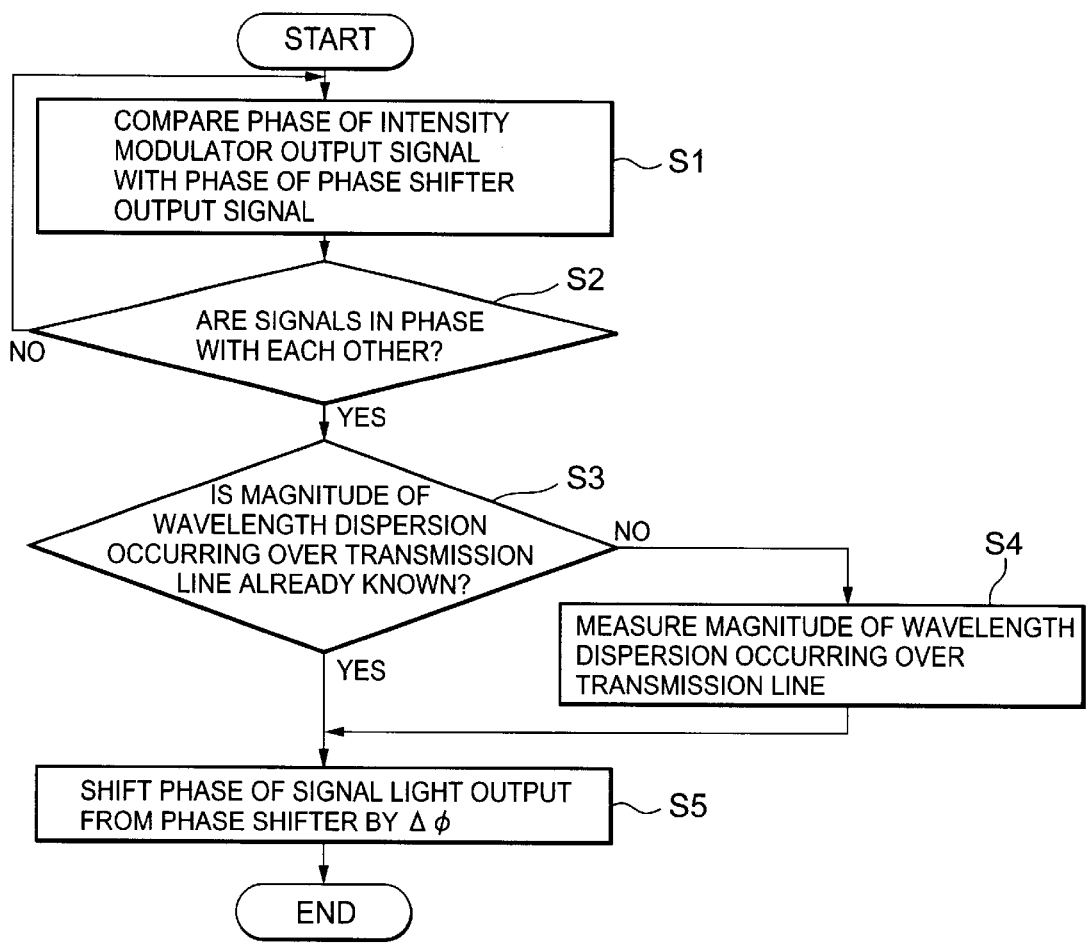
FIG. 2 is a flowchart describing a procedure of setting phase shift employed in the first embodiment of the present invention.
Figure 3:
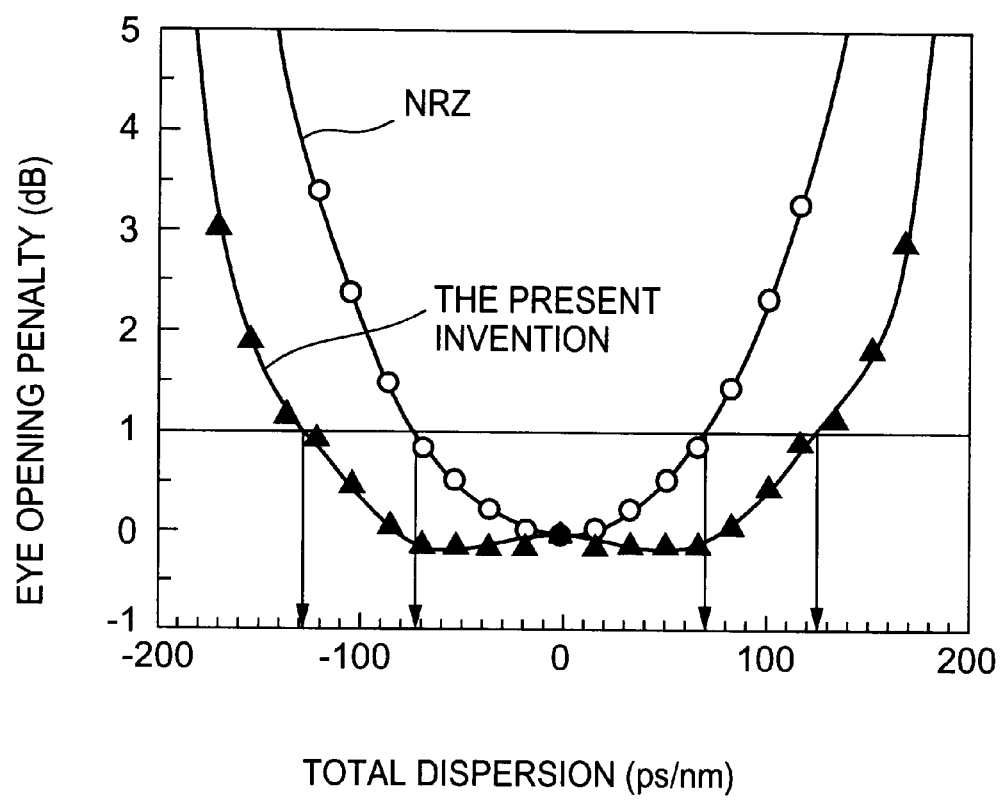
FIG. 3 is a graph expressing the advantage of the optical transmitter in accordance with the first embodiment of the present invention.

FIG. 2 is a flowchart describing how to set a shift to be provided by the phase shifter 16 in the optical transmitter 1. FIG. 3 is a graph expressing the advantage provided by the optical transmitter 1 in accordance with the first embodiment of the present invention. Referring to FIG. 1 to FIG. 3, a description will be made of a procedure of setting the phase shift to be provided by the optical transmitter 1.

To begin with, the gain variation device 15 is adjusted so that the power of a light signal output from the intensity modulator 14 will be agreed with the power of continuous-wave light output from the phase shifter 16. Thereafter, the phase $\phi 1$ of a carrier that is a light signal output from the intensity modulator 14 is matched with the phase $\phi 2$ of the continuous-wave light output from the phase shifter 16 (step S1 and S2 in FIG. 2).

On the assumption that the magnitude D of wavelength dispersion occurring over the transmission line is already known, the phase of a phase shifter output signal light is shifted by $\Delta\phi$ ($=(1/3)\times 10^{-5} \times (\lambda f)^2 D \times \pi$) using the phase shifter 16 (step S3 and S5 in FIG. 2).

In the above formula, $\lambda[\mu m]$ denotes the wavelength of continuous-wave light output from the light source 11. D[ps/nm] denotes the magnitude of wavelength dispersion occurring over a transmission line, and f[GHz] denotes a frequency. According to the present invention, the frequency f is set to a half of a clock frequency. When $\Delta\phi$ exceeds $2\pi/3$, it is set to $2\pi/3$. When $\Delta\phi$ is equal to or smaller than $-2\pi/3$, it is set to $-2\pi/3$. When the magnitude D of wavelength dispersion occurring over a transmission line is unknown (step S3 in FIG. 2), D is measured (step S4 in FIG. 2).

According to the present embodiment, a transmission rate of data carried by signal light is set to 40 Gbps. The intensity modulation method is based on the non-return-to-zero (NRZ) method. A single-mode fiber is used as the transmission line.

An advantage to be provided by the present embodiment will be described in conjunction with FIG. 3. The axis of abscesses in FIG. 3 indicates magnitudes of dispersion occurring over the transmission line, and the axis of ordinates indicates power losses depicted as eye opening degradation in an eye pattern. In FIG. 3, a curve indicated with "present invention" is plotted with the results of calculation of the magnitude D of wavelength dispersion. For calculating the magnitude of positive dispersion, $0.92\pi$ is assigned to $\Delta\phi$. For calculating the magnitude of negative dispersion, $0.08\pi$ is assigned to $\Delta\phi$. For compare son, FIG. 3 also shows a curve plotted with the results of calculation of the magnitude D of wavelength dispersion to be exhibited by a light signal modulated according to the ordinary, NRZ method. As apparent from FIG. 3, compared with the NRZ method, a coding method employed in the present embodiment makes an optical transmission system resistive to dispersion of about twice a larger magnitude. The present embodiment may be combined with any other coding method, for example, the return-to-zero (RZ) method. Even in this case, an optical transmission system will be resistive to dispersion of about twice a larger magnitude.

Figure 4:
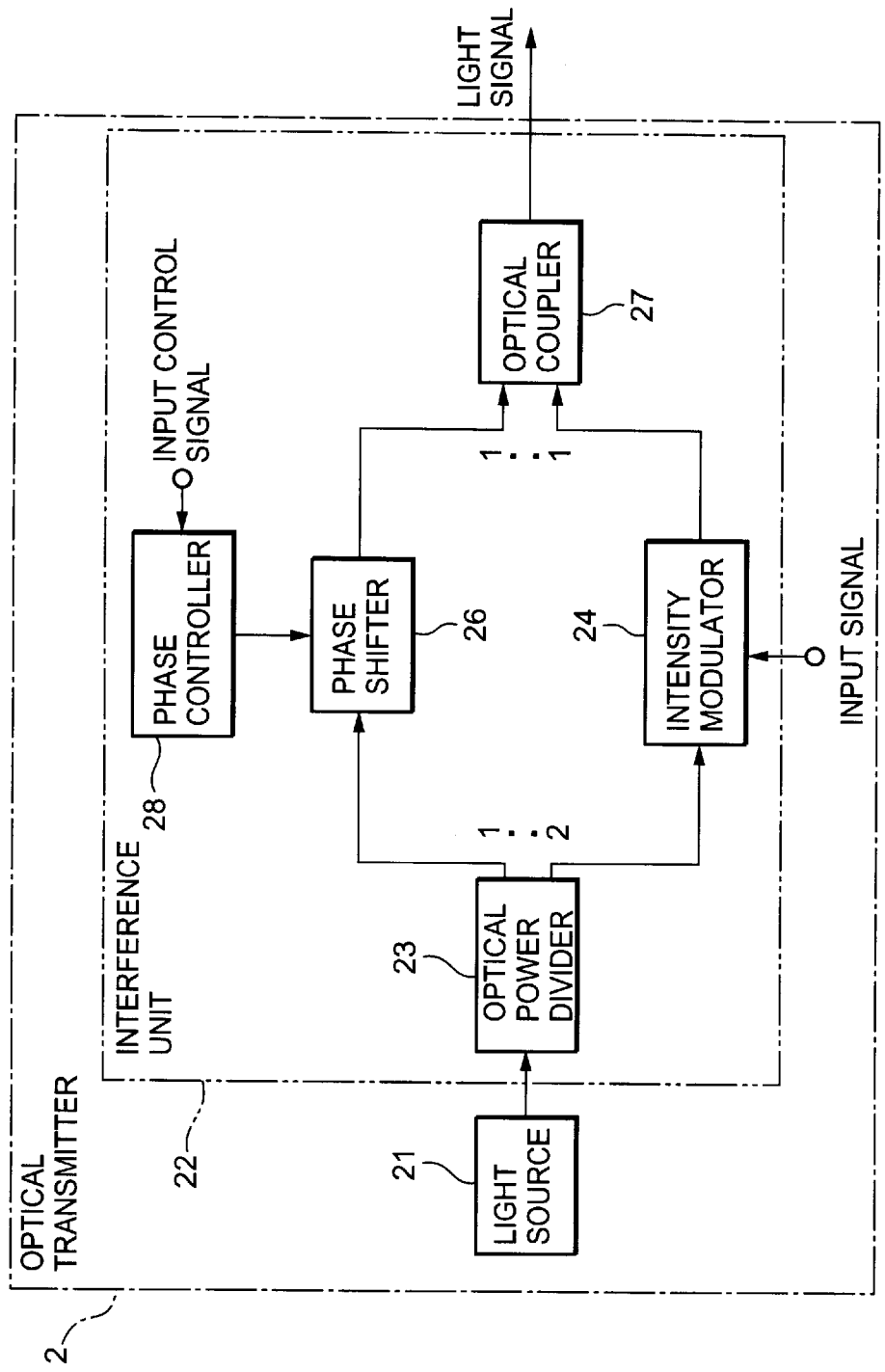
FIG. 4 is a block diagram showing the configuration of an optical transmitter in accordance with the second embodiment of the present invention.

FIG. 4 is a block diagram showing the configuration of an optical transmitter in accordance with the second embodiment of the present invention. Referring to FIG. 4, an optical transmitter 2 comprises a light source 21 and an interference unit 22. The interference unit 22 comprises an optical power divider 23, an intensity modulator 24, a phase shifter 26, an optical coupler 27, and a phase controller 28. The optical transmitter in accordance with the present embodiment is different from the optical transmitter 1 in accordance with the first embodiment in terms of the interference unit 22 alone.

A dividing ratio at which the optical power divider 23 divides a light signal is determined so that the mean powers of lights output from the intensity modulator 24 and phase shifter 26 respectively and coupled by the optical coupler 27 will be equal to each other. Assume that light losses occurring through two paths that extend from the optical power divider 231 to the optical coupler 27 are equal to each other, and that a coupling ratio at which the optical coupler 27 couples two rays is 1:1. In this case, the dividing ratio at which the optical power divider 23 divides a light signal is set to 1:2. When the requirements are changed, the dividing ratio at which the optical power divider 23 divides a light signal is modified accordingly.

The present embodiment is characterized in that the coupling ratio at which the optical coupler 27 couples two lights is 1:1. The gain variation device 15 included in the optical transmitter 1 in accordance with the first embodiment of the present invention is excluded from the present embodiment. This leads to the more compact optical transmitter.

Figure 5:
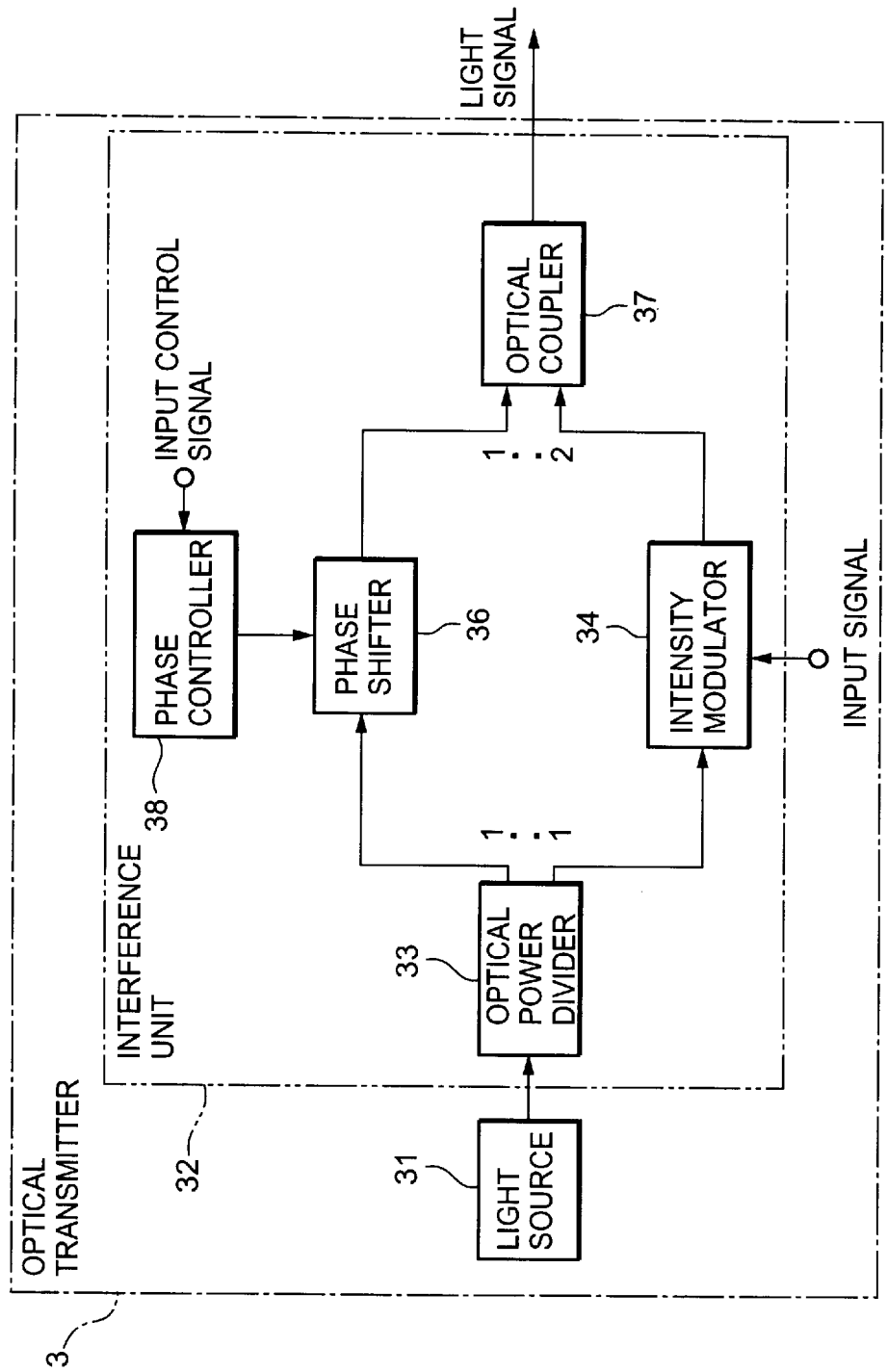
FIG. 5 is a block diagram showing the configuration of an optical transmitter in accordance with the third embodiment of;the present invention.

FIG. 5 is a block diagram showing the configuration of an optical transmitter in accordance with the third embodiment of the present invention. Referring to FIG. 5, an optical transmitter 3 comprises a light source 31 and an interference unit 32. The interference unit 32 comprises an optical power divider 33, an intensity modulator 34, a phase shifter 36, an optical coupler 37, and a phase controller 38. The optical transmitter in accordance with the present embodiment is different from the optical transmitter 1 in accordance with the first embodiment in terms of the interference unit 32 alone.

The present embodiment is characterized in that a dividing ratio at which the optical power divider 33 divides a light signal is 1:1. Moreover, the optical coupler 37 couples two lights at a coupling ratio of 1:2. Continuous-wave light output from the phase shifter 36 and signal light output from the intensity modulator 34 are coupled at 1:2. The coupling ratio is not limited to 1:2. However, 1:2 is the most preferable. The gain variation device 15 included in the optical transmitter 1 in accordance with the first embodiment is excluded from the present embodiment. This leads to the more compact optical transmitter.

Figure 6:
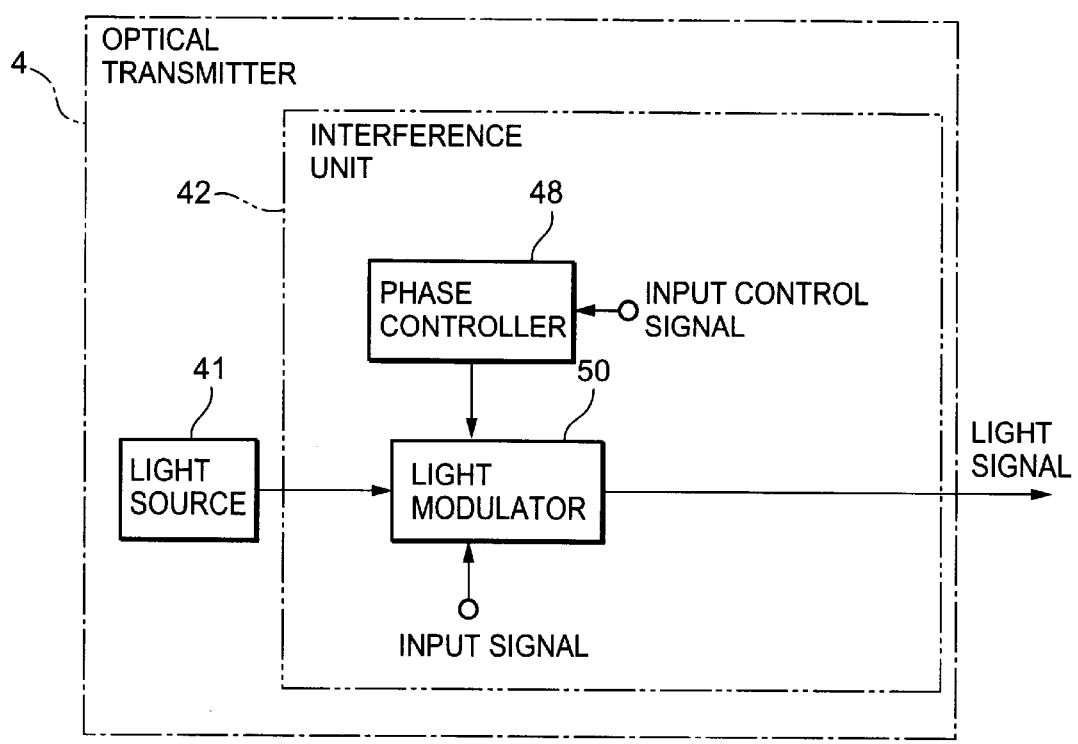
FIG. 6 is a block diagram showing the configuration of an optical transmitter in accordance with the fourth embodiment of the present invention.

FIG. 6 is a block diagram showing the configuration of an optical transmitter in accordance with the fourth embodiment. Referring to FIG. 6, an optical transmitter 4 comprises a light source 41 and an interference unit 42. The interference unit 42 comprises a light modulator 50 and a phase controller 48.

The optical transmitter in accordance with the present embodiment is different from the optical transmitter 1 in accordance with the first embodiment in terms of the interference unit 42 alone. The interference unit 42 is constructed in the form of one module serving as the light modulator 50.

Figure 7:
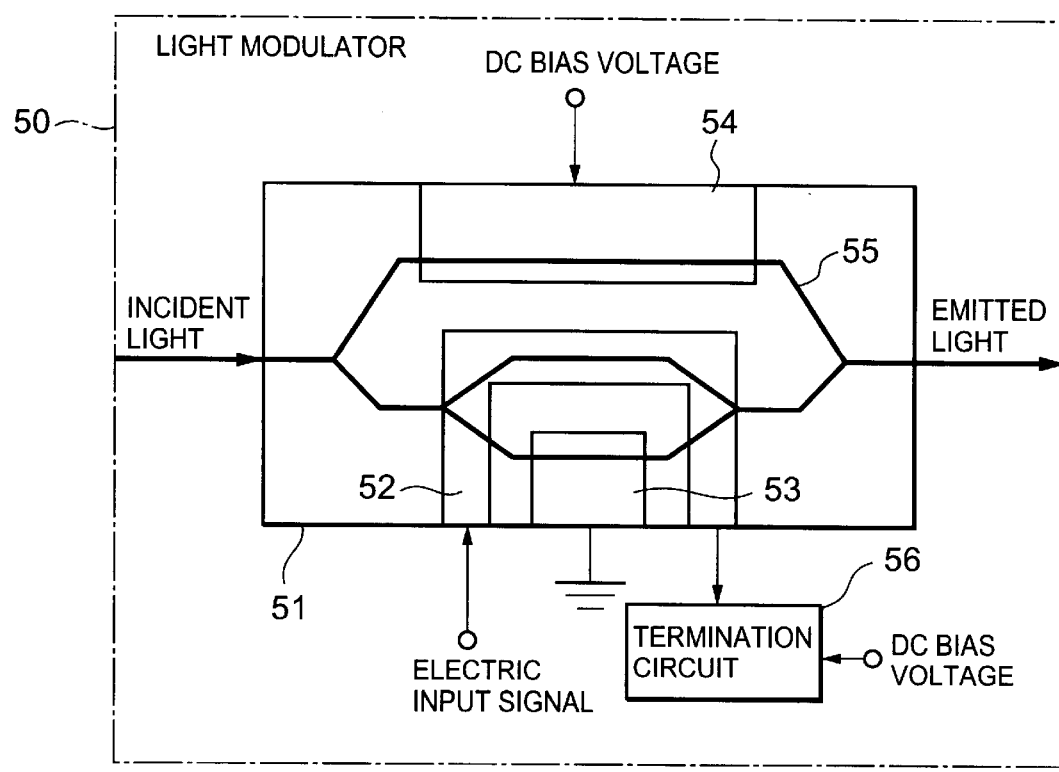
FIG. 7 shows the configuration of a light modulator shown in FIG. 6.

FIG. 7 shows the configuration of the light modulator 50 shown in FIG. 6. Referring to FIG. 7, the light modulator 50 comprises a modulation device 51, a modulation electrode 52, a ground 53, a dc bias electrode 54, an optical waveguide 55, and a termination circuit 56.

A device exerting a great electro-optic effect and made of $LiNbO_3$ or $LiTaO_3$ is preferable as the modulation device 51. $LiNbO_3$ is more preferable. A dividing ratio and coupling ratio at which a light signal is divided over the optical waveguide and lights are coupled over it are the same as those employed in the second or third embodiment.

According to the present embodiment, the interference unit 12 included in the optical transmitter 1 of the first embodiment is constructed in the form of a module serving as the light modulator 50. This leads to the more compact optical transmitter. Besides, more stable actions are performed owing to the interference unit 52.

Figure 8:
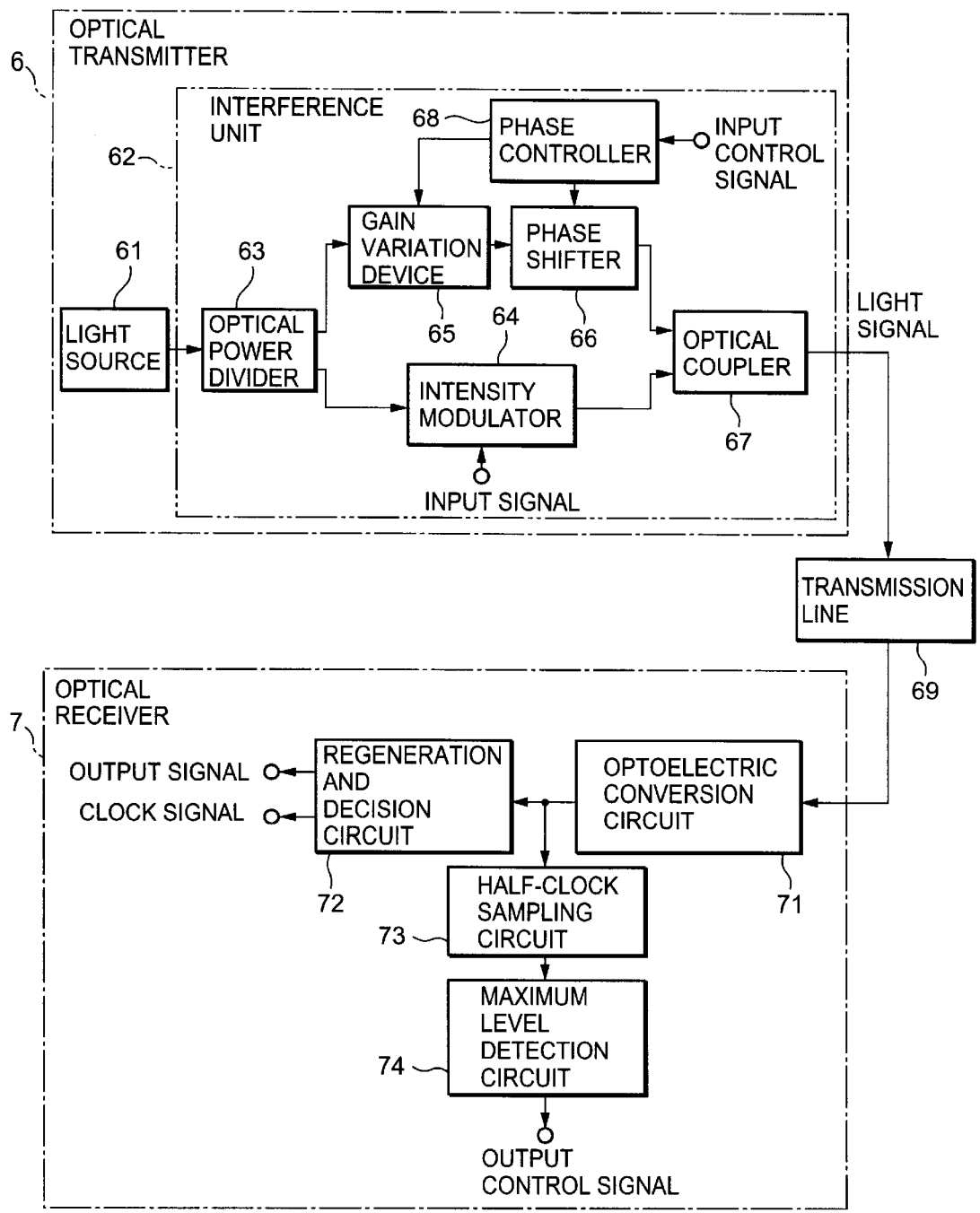
FIG. 8 is a block diagram showing the configuration of an optical transmission system in accordance with the fifth embodiment of the present invention.

FIG. 8 is a block diagram showing the configuration of an optical transmission system in accordance with the fifth embodiment of the present invention. Referring to FIG. 8, the optical transmission system in accordance with the present embodiment comprises an optical transmitter 6 and an optical receiver 7.

The optical transmitter 6 comprises, similarly to the optical transmitter 1 in accordance with the first embodiment, a light source 61 and an interference unit 62. The interference unit 62 comprises an optical power divider 63, an intensity modulator 64, a gain variation device 65, a phase shifter 66, an optical coupler 67, and a phase controller 68. The optical receiver 7 comprises a photoelectric conversion unit 71, a reproduction and identification circuit 72, a half-clock extracting circuit 73, and a maximum level detection circuit 74.

A light signal transmitted from the optical transmitter 6 and propagated over a transmission line 69 is converted into an electric signal by the photoelectric conversion unit 71 included in the optical receiver 7. The electric signal is divided into two signals. One of two resultant electric signals is converted into a clock signal and an identified and reproduced output signal by the identification and reproduction circuit 72. The other electric signal is input to the half-clock sampling circuit 73, whereby a half-clock frequency signal Is extracted. The half-clock extracting circuit 73 is realized with, for example, a narrow-band filter.

The half-clock frequency signal extracted by the half-clock sampling circuit 73 is input to the maximum level detection circuit 74. A control signal is then produced. The control signal produced by the maximum level detection circuit 74 is transferred to the phase controller 68 included in the optical transmitter 6. An alarm signal transmission electric cable normally contained in the transmission line 69 is preferably used to transfer the control signal.

Figure 9:
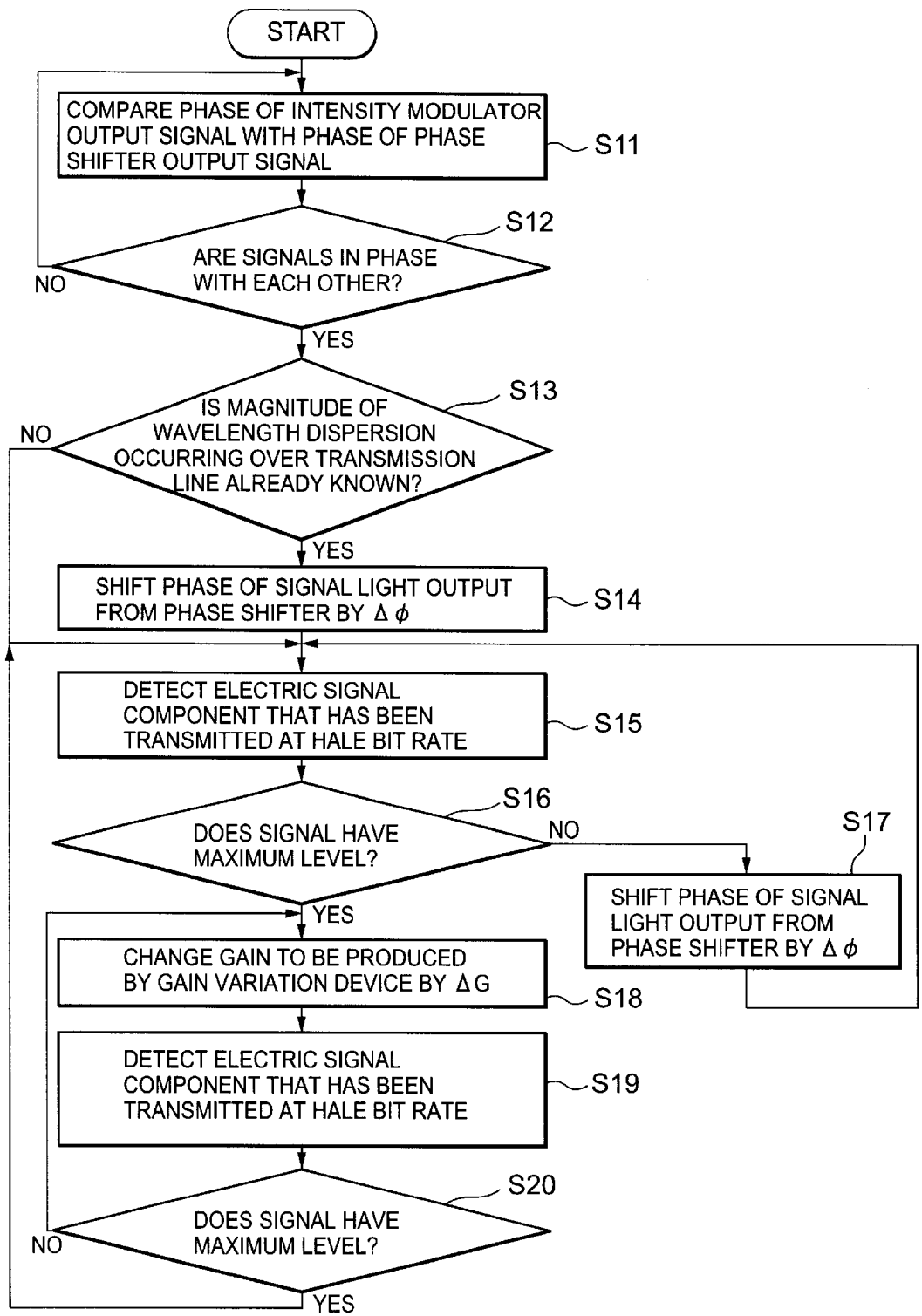
FIG. 9 is a flowchart describing a procedure of setting a phase shift employed in the fifth embodiment of the present invention.

FIG. 9 is a flowchart describing a procedure of setting a shift to be provided by the phase shifter 66 and a gain to be produced by the gain variation device 65. Referring to FIG. 8 and FIG. 9, a description will be made of actions to be performed in the optical transmission system in accordance with the present embodiment. Actions to be performed when the magnitude D of wavelength dispersion occurring over the transmission line is already known are identical to the aforesaid actions to be performed in the optical transmitter 1 in accordance with the first embodiment shown in FIG. 2.

When the magnitude of wavelength dispersion of the transmission line is unknown, the phase shifter 66 shifts the phase of a phase shifter output signal by a shift that ranges from −2π/3 to 2π/3. At this time, the phase shift Δφ is determined so that a half-clock frequency signal extracted by the half-clock extracting circuit 73 included in the optical receiver 7 will be maximized. Otherwise, nothing is performed and control is passed to the next processing.

In the optical receiver 7, the half-clock frequency signal that is a component of a reception signal is detected. A shift to be provided by the phase shifter 66 and a gain to be produced by the gain variation device 65 are controlled in order to maximize the voltage, current, or power level of the detected signal (steps S1 to S20 in FIG. 9).

The phase shifter 66 shifts the phase of the phase shifter output signal by Δθ (step S17 in FIG. 9). The phase is adjusted in order to maximize the half-clock frequency signal (steps S15 to S17 in FIG. 9).

A gain to be produced by the gain variation device 65 is then changed (step S18 in FIG. 9), and adjusted in order to maximize the half-clock frequency signal (steps S18 to S20 in FIG. 9) After the maximum level of the half-clock frequency signal is determined, the half-clock frequency signal is monitored and kept controlled so that it will be retained at the maximum level (step S15 to step S20 in FIG. 9).

Included in the present embodiment is the means for extracting a clock component (half-clock frequency component) having a half of the clock frequency of a data signal from an electric signal received by the receiver. Also included is the means for controlling the phase of a carrier component of an optical transmission signal or optical reception signal so that the voltage, current, or power level of the extracted clock component will be maximized. Even when the magnitude of wavelength dispersion occurring over a transmission line varies time-sequentially, the variation can be compensated readily. Eventually, waveform deterioration derived from dispersion can be compensated readily.

The foregoing advantage will be explained using a formula. When the phase of part of light output from a light source is shifted by Δφ, the spectrum S(f) of an electric signal resulting from photoelectric conversion performed by a receiver is, as mentioned above, expressed as follows:

$$S(f) = \alpha \times 2\cos(\Delta\phi/2)$$

$$\cos(\pi f^2 \lambda^2 D/c - \Delta\phi/2) G(f) + \gamma(f)$$

When the eye openings in an eye pattern depicting a reception signal shrink along with deterioration in a transmission characteristic, a half-clock frequency component diminishes. Therefore, the half-clock frequency component is monitored, and Δφ is changed properly in order to compensate deterioration in the half-clock frequency component. Consequently, even when the magnitude of wavelength dispersion occurring over a transmission line varies time-sequentially, the variation can be compensated readily. Eventually, deterioration in the waveform of a light signal derived from dispersion can be compensated readily.

According to the present invention, since the aforesaid method is employed, the spectrum of a conventionally employed light signal will not be widened. Moreover, dispersion can be compensated relative to each channel. The method will therefore be effectively implemented in wavelength division multiplexing communication.

Consequently, an optical transmission system resistive to wavelength dispersion can be provided. Even when wavelength dispersion occurring over a transmission line varies time-sequentially, the variation can be compensated readily.

Eventually, deterioration in the waveform of a light signal derived from dispersion can be compensated readily. In a wave length division multiplexing communication system, dispersion can be readily compensated relative to each channel. Besides, the spectrum of a transmission signal can be held unchanged.

Figure 10:
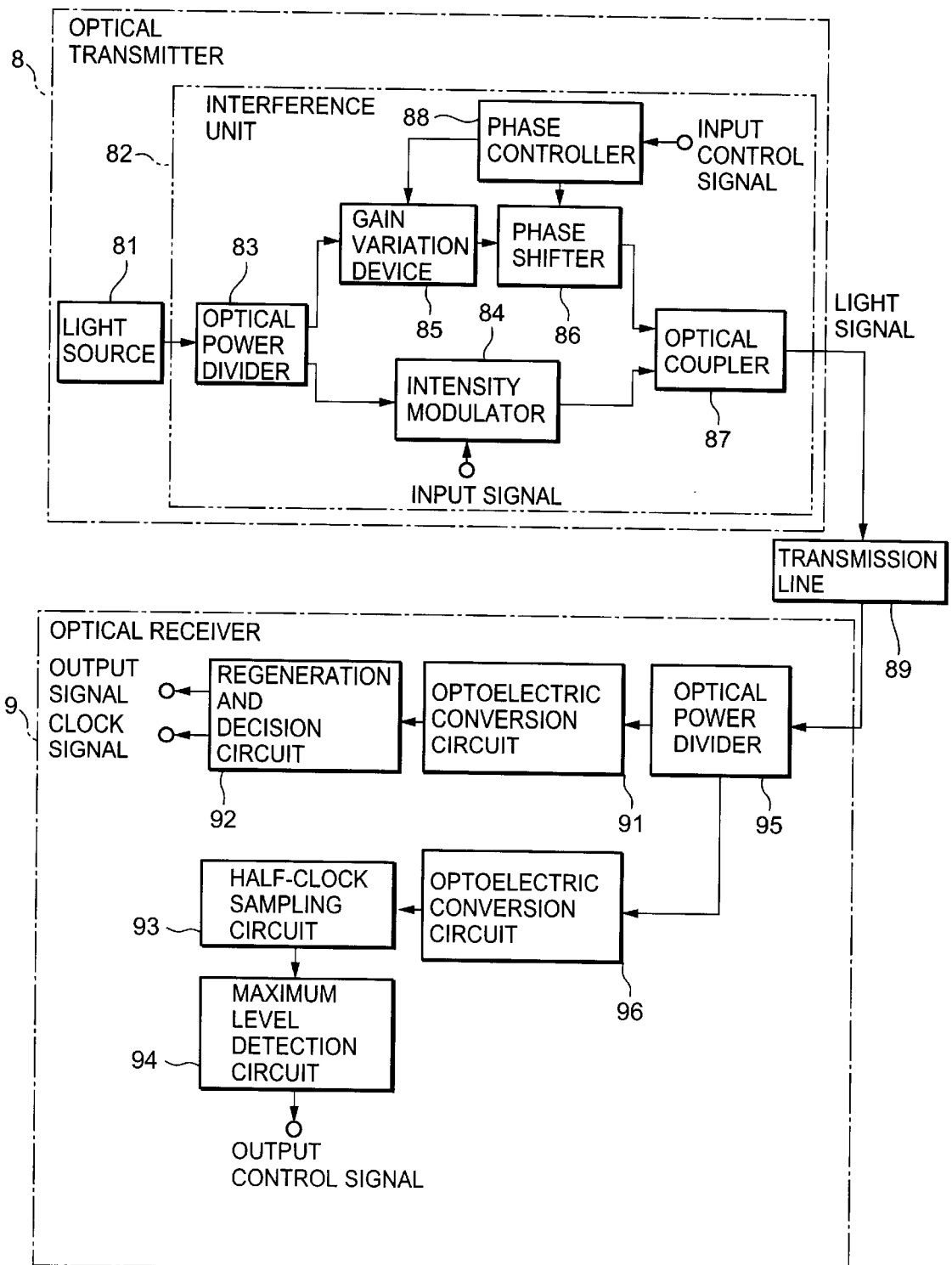
FIG. 10 is a block diagram showing the configuration of an optical transmission system in accordance with the sixth embodiment of the present invention.

FIG. 10 is a block diagram showing the configuration of an optical transmission system in accordance with the sixth embodiment of the present invention. Referring to FIG. 10, the optical transmission system in accordance with the present embodiment comprises an optical transmitter 8 and an optical receiver 9.

The optical transmitter 8 comprises, similarly to the optical transmitter 1 in accordance with the first embodiment, a light source 81 and an interference unit 82. The interference unit 82 consists of a first optical power divider 83, an intensity modulator 84, a gain variation device 85, a phase shifter 86, an optical coupler 87, and a phase controller 88.

The optical receiver 9 has a different configuration from the optical receiver 7 of the optical transmission system in accordance with the fifth embodiment of the present invention. The optical receiver 9 comprises a first photoelectric conversion unit 91, a regeneration and identification circuit 92, a half-clock extracting circuit 93, a maximum level detection circuit 94, a second optical power divider 95, and a second photoelectric conversion unit 96.

In the optical receiver 9, a light signal input over a transmission line 89 is divided into two by the second optical poser divider 95. One of resultant light signals is converted into an electric signal by the first photoelectric conversion unit 91, and then converted into a clock signal and a regenerated and identified output signal by the regeneration and identification circuit 92. The other light signal is converted into an electric signal by the second photoelectric conversion unit 96, and then input to the half-clock extracting circuit 93. Consequently, a half-clock frequency signal is extracted.

The half-clock frequency signal extracted by the half-clock extracting circuit 93 is input to the maximum level detection circuit 94. A control signal is then produced. The configuration of the interference unit 82 may be identical to that of the interference unit 22 employed in the second embodiment, the interference unit 32 employed in the third embodiment, or the interference unit 42 employed in the fourth embodiment.

The phase of a carrier component of an optical transmission signal or optical reception signal is shifted in order to minimize a phase difference between the carrier component of a light signal transmitted over the transmission line 69 or 89 and the other frequency component. Deterioration in the waveform of the light signal derived from wavelength dispersion and manifested during photoelectric conversion is therefore suppressed. Consequently, the resistivity of the optical transmission system to dispersion of a transmission signal can be improved markedly. The results of numerical calculation graphically shown in FIG. 3 demonstrate that the optical transmission system is resistive to dispersion whose magnitude is twice as large as that of dispersion to which conventional optical transmission systems are resistive.

Moreover, the optical receiver 7 or 9 includes a means for detecting a half-clock frequency signal component of a received electric signal and for giving control to maximize the voltage, current, or power level of the half-clock frequency signal component. When wavelength dispersion occurring over the transmission line 69 or 89 varies time-sequentially, the variation can be compensated readily.

Eventually, deterioration in the waveform of a light signal derived from dispersion can be compensated readily.

Furthermore, dispersion can be readily compensated relative to each channel. Even when the method in accordance with the present invention is implemented, the spectrum of a light signal remains unchanged. For this reason, the method will be effectively implemented in wavelength division multiplexing communication.

The above description is concerned with a light modulation method. The present invention can be implemented in various modes. The optical transmitters 1 to 3, 6, and 8 include the intensity modulators 14, 24, 34, 64, and 84. Alternatively, any of other various types of light modulators or modulation methods may be adopted. The present invention will prove effective when implemented in a configuration including, for example, a combination of a phase modulator and an intensity modulator.

The optical transmitters 1 to 4, 6, and 8 in accordance with the present invention transmit data using one channel. The method in accordance with the present invention will prove effective even when multiple channels are used.

In the optical transmitters 1 to 3, 6, and 8 in accordance with the present invention, a shift to be provided by the phase shifter 16, 26, 36, 66, or 86 and a gain to be produced by the gain variation device 15, 65, or 85 are changed using a control signal. The present invention is not limited to this mode. Alternatively, the shift and gain may be fixed to certain optimal values.

Furthermore, according to the light modulation method of the present invention, the interference unit 12, 22, 32, 62, or 82 having the phase shifter 16, 26, 36, 66, or 86 shifts the phase of a carrier component among all the frequency components of alight signal. The present invention is not limited to this mode. As long as the phase of the carrier component alone is shifted, the interference unit may have any components. For example, two light sources having the same resonant frequency may be employed. In this case, continuous-wave light emanating from one of the light sources is modulated using an electric signal in order to produce a light signal. The phase of continuous-wave light emanating from the other light source is shifted. Both the light signals are then joined.

Any circuit elements may be adopted for the circuits and devices included in the first to sixth embodiments of the present invention as long as they have the capabilities of the aforesaid circuits and devices.

As described so far, according to the present invention, an optical transmitter for transmitting a modulated light signal shifts the phase of light used as a carrier. Owing to the configuration, the precoder circuit that is essential to the conventional optical duobinary method need not be included. According to the present invention, an optical transmission method for optically transmitting an NRZ or RZ signal that can be improved the resistivity of an optical transmission system to dispersion can be realized.

While this invention has been described in connection with certain preferred embodiment, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical transmitter comprising:
    an optical power divider for dividing input light into first and second continuous wave (CW) lights;
    a light modulator for modulating said first CW light according to a data signal so as to output modulated light;
    a phase shifter for shifting the phase of said second CW light so as to output phase-shifted light, wherein said phase shifter is adjustable to vary a magnitude of phase shift of said second CW light based on a magnitude of wavelength dispersion occurring over a transmission line; and
    an optical coupler for coupling said modulated light and said phase-shifted light.

2. The optical transmitter according to claim 1, wherein a dividing ratio at which said optical power divider divides light is determined so that the mean power of said modulated light and the mean power of said phase-shifted light will be significantly equal to each other.

3. The optical transmitter according to claim 1, further comprising at least one gain variation device inserted in at least one of a plurality of paths extending from said optical power divider to said optical coupler.

4. The optical transmitter according to claim 1, wherein said light modulator comprises an intensity modulator.

5. The optical transmitter according to claim 1, wherein said light modulator comprises a phase modulator.

6. The optical transmitter according to claim 1, wherein said optical power divider, light modulator, phase shifter, and optical coupler are integrated into one optical substrate.

7. The optical transmitter according to claim 1, further comprising a light source for generating said input light.

8. An optical transmission system, comprising:
    an optical transmitter for outputting a light signal;
    an optical transmission line over which said light signal is transmitted; and
    an optical receiver for receiving said light signal output over said transmission line, wherein said optical transmitter comprises an optical transmitter set forth in claim 1;
    said optical receiver;
    comprising a first photo-detector for converting a first light signal to an electric signal; a clock extracting circuit for extracting a predetermined frequency component of the electric signal and outputting it as a clock signal; and a maximum level detection circuit for detecting the maximum level of said clock signal;
    said optical transmission line includes a control signal transmission line over which said maximum level is transmitted to said optical transmitter; and
    said optical transmitter further includes a phase controller for outputting a control signal with which a phase shift to be provided by said phase shifter is adjusted in order to maximize said maximum level.

9. The optical transmitter according to claim 1, further comprising a phase controller for controlling said phase shifter.

10. An optical transmission system, comprising:
    an optical transmitter for outputting a light signal;
    an optical transmission line over which the light signal is transmitted; and
    an optical receiver for receiving the light signal output over said transmission line,
    wherein said optical transmitter comprising an optical power divider for dividing input light into first and second continuous wave (CW) lights; a light modulator for modulating said first CW light according to a data signal so as to output modulated light; a phase shifter for shifting the phase of said second CW light so as to output phase-shifted light, wherein said phase shifter is adjustable to vary a magnitude of phase shift of said second CW light based on a magnitude of wavelength dispersion occurring over a transmission line; and an optical coupler for coupling said modulated light and said phase-shifted light;

said optical receiver comprising a first photo-detector for converting a first light signal to electric signal, a clock extracting circuit for extracting a predetermined frequency component of the electric signal and outputting it as a clock signal and a maximum level detection circuit for detecting the maximum level of said clock signal, and an optical power divider for dividing a second light signal to be input so as to output said first light signal and second division light, and second photo-detector for converting the light into an electric signal;

said optical transmission line includes a control signal transmission line over which said maximum level is transmitted to said optical transmitter; and said optical transmitter further includes a phase controller for outputting a control signal with which a phase shift to be provided by said phase shifter is adjusted in order to maximize said maximum level.

11. An optical transmission method, comprising the steps of:

dividing light output from a light source into at least two division lights;

adjusting a magnitude of phase based on a magnitude of wavelength dispersion occurring over a transmission line;

shifting the phase of one of said division lights so as to produce phase-shifted light;

modulating the other division light so as to produce modulated light; and coupling said phase-shifted light and modulated light.

12. The optical transmission method according to claim 11, wherein said producing phase-shifted light includes a step of adjusting the power of at least one of said division lights and phase-shifted light.

13. The optical transmission method according to claim 11, wherein said producing modulated light includes a step of adjusting the power of at least one of said division lights and modulated light.

* * * * *